United States Patent [19]

Reiff et al.

[11] 4,102,051
[45] Jul. 25, 1978

[54] SIDE-BAR FOR MEASURING AND/OR TRACING DEVICE

[75] Inventors: Karl Reiff, Plochingen; Klaus Masur, Esslingen, both of Germany

[73] Assignee: Fa. C. Stiefelmauer K.G., Esslingen, Germany

[21] Appl. No.: 754,818

[22] Filed: Dec. 27, 1976

[30] Foreign Application Priority Data

Mar. 9, 1976 [DE] Fed. Rep. of Germany ....... 2609670

[51] Int. Cl.² ......................... G01B 5/20; F16C 23/00
[52] U.S. Cl. ............................... 33/174 P; 33/169 R; 308/3 A; 104/242
[58] Field of Search ................... 33/174 P, 169 R, 42, 33/1 M; 308/3 A, 3.9; 104/242, 245, 247, 106, 110

[56] References Cited

U.S. PATENT DOCUMENTS 3,813,789  6/1974  Shelton .............................. 33/169 R Primary Examiner—Richard E. Aegerter
Assistant Examiner—Willis Little
Attorney, Agent, or Firm—William Anthony Drucker

[57] ABSTRACT

A slide bar for guiding the carriage of a measuring or tracing device along a side of a levelling plate. The slide bar includes a guide rail which is divided into a first strip and a second strip having respective guide faces, the first and second strips being connected by a connector capable of acting as a biaxial joint, and the second strip being positionable adjustably with respect to the levelling plate by means of securing devices and distance pieces such that it may be brought exactly into parallelism with a reference line on the levelling plate.

16 Claims, 2 Drawing Figures

SIDE-BAR FOR MEASURING AND/OR TRACING DEVICE

The present invention relates to a slide-bar for guiding the carriage of a preferably 3-dimensional measuring and/or tracing device along one longitudinal side of a stationary levelling plate, to the upper plane surface of which workpieces to be measured and/or traced can be secured, fitted with at least one guide rail having a horizontal guide surface and a substantially rectangular longitudinal guide surface running at right angles thereto, said guide rail being adapted to rest against the side surface of the levelling plate with the aid of a rear supporting surface located approximately at right angles to the horizontal guide surface, and of being secured to this side surface by means of bolts, for example, and also of being aligned within a vertical plane in such a way that the horizontal guide surface runs substantially parallel to the plane surface of the levelling plate.

BACKGROUND OF THE INVENTION

Slide-bars of this type are provided along at least two opposing longitudinal sides of the levelling plates. As a rule, a second rail, of angular cross-section, runs above each guide rail and rests with the narrow side of one limb against the side surface of the levelling plate, so that the other limb projects upwards, or better still downwards, rather in the form of a hook. The carriage of the measuring and/or tracing device bears a vertical column to which is secured a transverse sliding unit which can be moved in a vertical direction and which holds a cross arm moving horizontally and parallel to the plane surface of the levelling plate and thus at right angles to the path of the slide-bar.

The purpose of the upper angle-shaped rail is to support the carriage mainly in a direction approximately at right angles to the side surface of the levelling plate. To achieve this, small rollers on the carriage engage inside the projecting hook-shaped limb. The guide rail running a short distance below it serves two purposes. Its horizontal guide surface acts as a horizontal supporting surface on which the carriage is borne in a direction at right angles to the plane surface of the levelling plate, running on guide rollers. In addition, this horizontal guide surface determines the horizontal direction of travel of the carriage. The guide rail must therefore be accurately aligned so that the horizontal guide surface runs parallel to the plane surface of the levelling plate, at least when regarded in the direction of travel of the carriage. Any deviation from this horizontal path results in the carriage running uphill or downhill on the horizontal guide surface, leading to an increase or decrease in the vertical distance between the plane surface of the levelling plate and a fixed point on the cross arm when the carriage moves along the horizontal guide surface. Accurate measuring and/or tracing operations would then be impossible. The guide rail must therefore be aligned in the vertical plane with sufficient accuracy to ensure that, when the carriage moves along the horizontal guide surface, the cross arm of the device always runs and remains at the same vertical distance from the plane surface of the levelling plate.

The longitudinal guide surface determines the directional path when the carriage is operated. In this case, it is important that, as regards its linear path in a horizontal plane running parallel to the plane surface, the longitudinal guide surface be so aligned that it runs exactly parallel to a linear reference line, such as, for example, the lateral edge of the levelling plate, if the latter has been very accurately machined, or an imaginary linear line in the plane of the plane surface. Deviations would mean that, when the carriage moves along the guide rail, the horizontal distance between the linear reference line and a fixed point on the cross arm, measured in the plane of the plane surface and at right angles to the linear reference line, would decrease or increase instead of remaining constant. It would not then be possible to effect accurate measuring and/or tracing work of a parallel nature within the plane of the plane surface and at right angles to the direction of the cross arm. Any inaccuracy in the alignment of the guide rails, both of the horizontal guide surface on the one hand and of the longitudinal guide surface on the other hand, would thus give rise to relatively large measurement discrepancies, especially in the case of very long guide rails, which can easily be up to 6 meters in length, and these errors can, on the one hand, be in a direction perpendicular to the plane surface and, on the other hand, within the plane of the plane surface and thus at right angles to a linear reference line running at right angles to the direction of the cross arm.

With existing forms of guide rails, such discrepancies cannot be avoided, even if the guide rail is very accurately adjusted. The guide rail consists of a bar of very large cross-section with a continuous rear supporting surface by means of which the bar can be secured to the side surface of the levelling plate. The supporting surface runs at right angles to the horizontal guide surface and parallel to the longitudinal guide surface. If, with the aid of a spirit level or similar instrument, the guide rail is aligned in such a way that its horizontal guide surface runs exactly horizontally in a linear direction, this does not, as regards the longitudinal guide surface, ensure accurate linearity parallel to an imaginary linear reference line such as the lateral edge of the levelling plate; this is because, as a rule, the side surface of the levelling plate, regarded longitudinally, has surface irregularities, especially shape defects, and thus does not run exactly parallel to an imaginary linear reference line. Because the guide rail is also secured by its supporting surface to the side surface of the levelling plate in the rear sector of the longitudinal guide surface, these discrepancies in the parallelism of the side surface are transmitted to the longitudinal guide surface.

OBJECT OF THE INVENTION

The object of the invention is to provide a slide-bar of the type in question having a guide rail of which the horizontal guide surface, on the one hand, and the longitudinal guide surface, on the other hand, can to a large extent be adjusted independently of one another and, in particular, as far as the longitudinal guide surface is concerned, adjustment is possible relative to the side surface of the levelling plate, including compensation for discrepancies in the parallelism and/or shape of this side surface, in such a way that the longitudinal guide surface runs in its longitudinal alignment exactly parallel to a linear reference line within a horizontal plane.

SUMMARY OF THE INVENTION

With a slide-bar of the type initially desribed, this object is attained in accordance with the invention in that the guide rail, regarded transversely to its longitudinal direction, is divided over its entire length into a longitudinal strip carrying the longitudinal guide surface and a strip section carrying the horizontal guide surface and the rear supporting surface, which strips are connected to one another, over at least a major part of their length, by a longitudinal connector acting somewhat in the manner of a preferably biaxial joint, and in that the longitudinal strip can over its length, be secured to the side surface of the levelling plate by means of fixing devices and distance pieces so as to be adjustable in a direction at right angles to the vertical plane and in such a way that the longitudinal guide surface, in terms of its linear alignment, runs in a horizontal plane parallel to a linear reference line of the levelling plate, preferably a lateral edge on its side edge. The division of the guide rail into a strip section with the horizontal guide surface, on the one hand, and, on the other hand, a longitudinal strip, with a longitudinal guide surface, semiflexibly linked to the latter via the longitudinal connector, permits, at least to a certain extent, the adjustment of the longitudinal strip, with the longitudinal guide surface, irrespective of the position of the other strip section with the horizontal guide surface. The distance, transversely to the longitudinal direction, between the rear surface of the longitudinal strip and the side surface of the levelling plate can be adjusted by means of the distance pieces, and this can be done at numerous points along the longitudinal path. The longitudinal strip is secured to the side surface of the levelling plate by means of the fixing devices, the distance pieces being pressed firmly against the side surface, thereby acting as pressure units. It is thus possible, at numerous points throughout the length of the longitudinal strip, to regulate the intervening space transversely to the longitudinal direction of the longitudinal guide surface, even if the strip section with the horizontal guide surface has already been aligned and firmly clamped, and thus to effect such regulation, within limits, independently of this strip section. This is made possible by the semi-flexible longitudinal connector which, however, should be sufficiently rigid to ensure the maintenance of parallelism between the longitudinal strip and the strip section, regarded within a vertical plane passing transversely through the guide wall. This renders it possible to adjust the longitudinal guide surface relative to the side surface, and compensating for deviations in the parallelism and/or shape of this side surface, in such a way that the longitudinal guide surface, in terms of its linear alignment, runs within a horizontal plane and exactly parallel to a linear reference line, which can, for example, also be an edge of the plate running exactly parallel to the direction of the cross arms. This permits compensation for parallelism by several tenths of a mm.

In the case of one advantageous embodiment, the longitudinal connector consists of a longitudinal web of small cross-section which is at least to some extent deformable and preferably extends over the whole length of the rail. The longitudinal web can be an integral component of, and made of the same material as, both the longitudinal strip and the other strip section. In this case, the layout can be such that the guide rail has a longitudinal groove which divides it into a longitudinal strip and a strip section, runs in a longitudinal direction and, in the transverse direction, is open on one side, its depth forming a substantial proportion of the cross-section of the rail and its base being bounded by the longitudinal web which integrally connects the longitudinal strip and the strip section. The longitudinal groove runs in the main parallel to the horizontal guide surface, and it is advantageous if the sides of the longitudinal groove are also aligned substantially parallel to the horizontal guide surface. The longitudinal connector, especially the longitudinal web, is aligned approximately at right angles to the horizontal guide surface. In this way, the surface of the longitudinal web facing away from the base of the groove lies mainly within the plane containing the longitudinal guide surface. This general layout is particularly advantageous because it is relatively simple and cheap to manufacture. It goes without saying that the longitudinal strip can run both above or, which is generally preferable, below the other strip section. In this case, the longitudinal connector, which acts somewhat in the manner of a preferably biaxial joint, is represented by the one-piece longitudinal web. This latter is at least to some extent deformable in the sense that, as a result, the width of the opening of the longitudinal groove becomes larger or smaller at the open end. In addition, there is a certain amount of deformability around the second axis in that the sides of the groove are brought out of their parallel position.

It is of further advantage if the rear surface of the longitudinal strip situated opposite and approximately parallel to the longitudinal guide surface is set back relative to the rear supporting surface of the strip section and runs at a distance from it. The rear surface of the longitudinal strip thus does not rest against the side surface of the levelling plate. The distance can, for example, be about 0.5 mm. This means that, when adjusting the longitudinal strip, it is possible to set this rear surface either closer to or further away from the levelling plate at a large number of points on the side surface of the levelling plate along the length of the strip. The required distance is obtained by means of the distance pieces and by tightening the fixing devices which also serve the purpose of securing the longitudinal strip.

The fixing devices for the adjustable mounting of the longitudinal strip can take the form of bolts located, preferably at equal intervals, along its length, passing transversely through the longitudinal strip, which can be screwed into the side surface of the levelling plate. The distance pieces can consist of adjustable transverse pins which also pass transversely through the longitudinal strip and the free ends of which, pointing towards the side surface of the levelling plate, come up against the side surface. In one advantageous version, the transverse pins can be longitudinally adjusted by means of bolts mounted adjustably in the longitudinal strip and pressing axially against the corresponding transverse pin. In another advantageous version, the transverse pins are, for example, in the form of Allen set screws adjustably fitted in threaded holes passing through the longitudinal strip. In this instance, it is an advantage if the bolts and transverse pins are arranged along an imaginary and common line running approximately parallel to the horizontal guide surface. This overall layout is simple and cheap and, above all, permits delicate and accurate adjustment of the longitudinal guide surface at numerous points along its length. By screwing in the transverse pins more or less far in such a way that they project to a greater or lesser extent with their free ends beyond the rear surface of the longitudinal strip, the distance between the longitudinal guide surface and the side surface of the levelling plate can be controlled and, furthermore, at a larger number of individual points along its length. This adjustment is achieved by means of the bolts which, at the same time, ensure the fixing of the longitudinal strip to the side surface of the levelling plate.

It can also be an advantage if a transverse pin, especially a set screw, is fitted longitudinally in the longitudinal strip on both sides of a bolt and at a short distance therefrom. There is in consequence a short longitudinal distance between the transverse pin and the bolt, thereby avoiding the occurrence of deformation, especially sagging, of the longitudinal strip as a result of the stretching effect of the bolt on the centre point between two transverse pins on either side.

The bolts on the longitudinal strip can be staggered approximately centrally between and below the bolts by means of which the other strip section can be secured with its rear supporting surface to the side surface of the levelling plate. By this means, uniform and proper distribution of the tensional forces acting on the whole of the guide rail is achieved.

BRIEF DESCRIPTION OF THE DRAWINGS

The invention is described in greater detail below with the aid of one embodiment shown in the drawings.

In the drawings:

FIG. 3 is a section through the guide rail taken on the line III—III in FIG. 2;

FIG. 4 is a section through the guide rail taken on the line IV—IV in FIG. 2.

DESCRIPTION OF THE PREFERRED EMBODIMENT

Figure 1:
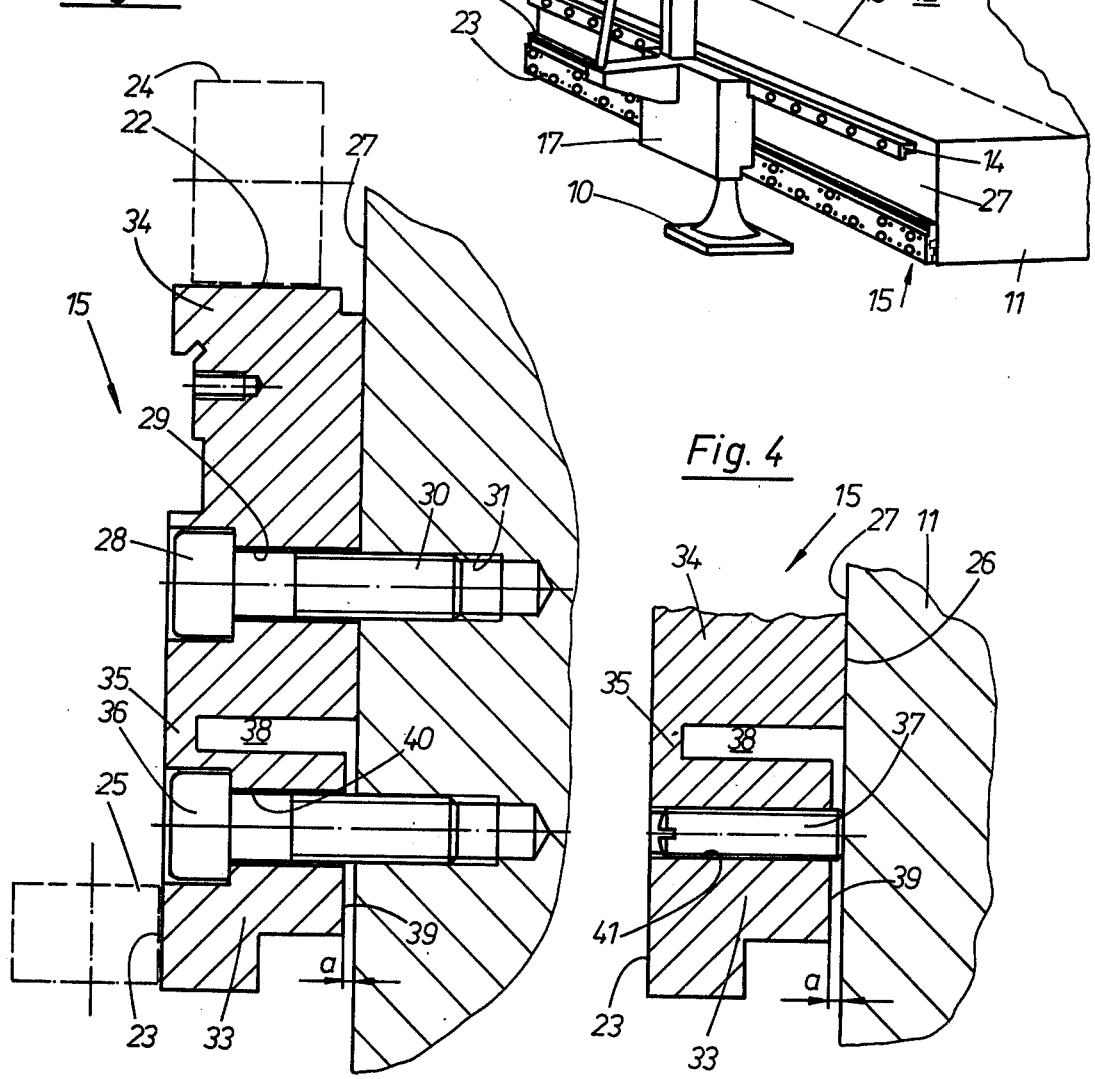
FIG. 1 is a perspective, diagrammatic view of a levelling plate with a three-dimensional measuring and/or tracing device movably mounted thereon.

FIG. 1 shows a stationary levelling plate II, supported on a foot 10, with an upper plane surface 12 onto which the workpieces to be measured and/or traced can be clamped. An imaginary linear reference line 13, shown as a broken line, runs within the plane of the plane surface 12. On its longitudinal side visible in FIG. 1 and, in precisely the same way, on it opposite longitudinal side which cannot be seen in FIG. 1, the levelling plate 11 has an upper angled rail 14 of the normal configuration, which is not described in any further detail here, and beneath the rail 14 a guide rail 15. A measuring and/or tracing device 16 can move, on and along the rail 14 and the guide rail 15, along the longitudinal side of the levelling plate 11 by means of a carriage 17 with a column 18 mounted thereon perpendicular to the plane surface 12, on which column a transverse sliding unit 19 can move and on which unit a cross arm 20 is adjustably mounted to move in a horizontal direction and parallel to the plane surface 12, and thus at right angles to the linear reference line 13. Near the end of the cross arm 20 is a holder 21 for a measuring or tracing tool which is not illustrated.

The guide rail 15 has an upper horizontal guide surface 22 and a longitudinal guide surface 23 running transversely and substantially at right angles thereto. The carriage 17 is supported, in a predominantly vertical direction, on the upper horizontal guide surface 22 and runs on guide rollers 24 shown as broken lines in FIG. 3. The horizontal guide surface 22 determines the path of the carriage 17 on a horizontal plane running parallel to the plane surface 12. The longitudinal guide surface 23 determines the directional path when the carriage 17 is operated in a longitudinal direction at a constant distance from the linear reference line 13. For this purpose, it is necessary for the horizontal guide surface 22 to be so aligned that it runs exactly plane parallel to the plane surface 12. The longitudinal guide surface 23 must be so aligned that, in terms of its linear path, it runs precisely parallel to the linear reference line 13. The carriage 17 is guided along the longitudinal guide surface 23 by rollers 25 shown in chain dotted lines in FIG. 3 and mounted in adjustable bearings which are not shown.

The guide rail 15 can be brought up against the narrow side surface 27 of the levelling plate 11 by means of a rear supporting surface 26 aligned at approximately right angles to the horizontal guide surface 22 and can be clamped to this side surface 27 by the indicated hexagon socket head bolts 28. The bolts 28 are arranged longitudinally at equal distances from one another. They pass transversely through the guide rail 15 in through-holes 29 and engage by a threaded portion 30 in corresponding threaded holes 31 drilled in the levelling plate 11 (FIG. 3). Alongside the through-holes 29 are additional through-holes 32, through which tapered pins, which are not shown, can be driven into corresponding holes in the levelling plate 11. When the guide rail 15 is being secured, it is possible to align it in a vertical plane containing the column 18 in such a way that the horizontal guide plane 22 runs substantially parallel to the plane surface 12 so that, when the carriage 17 is moved, it rolls absolutely parallel to the plane surface 12, and not uphill or downhill, on the horizontal guide surface 22.

In accordance with the invention, the entire length of the guide rail 15, regarded transversely to the longitudinal direction, is divided into a longitudinal strip 33 carrying the longitudinal guide surface 23, and into an upper strip section 34 carrying the horizontal guide surface 22 and the rear supporting surface 26. Over at least a substantial part of their length, both are joined to one another by a longitudinal connector 35 in the form of a longitudinal web of relatively thin cross-section, which acts somewhat in the mannor of a preferably biaxial joint. In the example shown, the longitudinal web 35 extends over the entire length of the guide rail 15.

The longitudinal strip 33 can be secured adjustably to the side surface 27 of the levelling plate 11, in a direction at right angles to the abovementioned vertical plane, throughout its length by means of fixing elements in the form of tension bolts 36 and of distance pieces in the form of set screws 37 in such a way that the longitudinal guide surface 23, in terms of its linear alignment, runs exactly parallel to the linear reference line 13, regarded within a horizontal plane lying parallel to the plane surface 12.

The longitudinal web 35 is an integral component of, and made of the same material as, both the longitudinal strip 33 and the strip section 34. In this embodiment, the guide rail 15 has a longitudinal groove 38 which divides it into a longitudinal strip 33 and a strip section 34, runs in a longitudinal direction and, in the transverse direction, is open on one side, to the right as seen in the illustration in FIGS. 3 and 4. The depth of the longitudinal groove 38 extends over a substantial proportion of the overall cross-section of the rail, giving a cross-sectional thickness of the longitudinal web 35 of about 1/6 to 1/7 of the cross-sectional thickness of the guide rail 15 as a whole. The base of the longitudinal groove 38 is thus bounded by the longitudinal web 35. The surface of the longitudinal web 35 facing away from the base of the groove lies within the plane containing the longitudinal guide surface 23. The longitudinal groove 38 runs approximately parallel to the horizontal guide surface 22, the sides of the groove also being aligned parallel to this surface. The longitudinal web 35 is aligned roughly at right-angles to the horizontal guide surface 22. As may be seen from FIGS. 3 and 4, it is important that the rear surface 39 of the longitudinal strip 33 situated opposite and approximately parallel to the longitudinal guide surface 23 is set back relative to the rear supporting surface 26 of the strip section 34 and runs at a distance from it, so that there is a gap $a$ between the rear surface 39 and the side surface 27 of the levelling plate 11. This gap is a few tenths of a mm, for example 0.5 mm. The longitudinal strip 33 and the other strip section 34 are thus connected, to a certain extent, in a somewhat flexible and articulated manner, as one unit, but are none the less adjustable, within limits, independently of one another.

The tension bolts 36 are located at equal intervals along the longitudinal strip 33 and pass transversely through the longitudinal strip 33 by the through-holes 40. They can be of the same type as the bolts 28 and engage by their threading in the corresponding threaded holes drilled in the levelling plate. The set screws 38, acting as distance pieces, are screwed to a greater or lesser depth into threaded through-holes 41 drilled in the longitudinal strip 33. They are cylindrical throughout their length and, as may be seen from FIG. 4, have hexagon socket heads. The set screws 37 press with their free ends, on the right as seen in FIG. 4, facing the side surface 27, against the side surface 27, thereby determining the gap $a$, which is fixed by screwing the set screws 37 more or less deeply into the threaded through-holes 41 at each point of adjustment.

Figure 2:
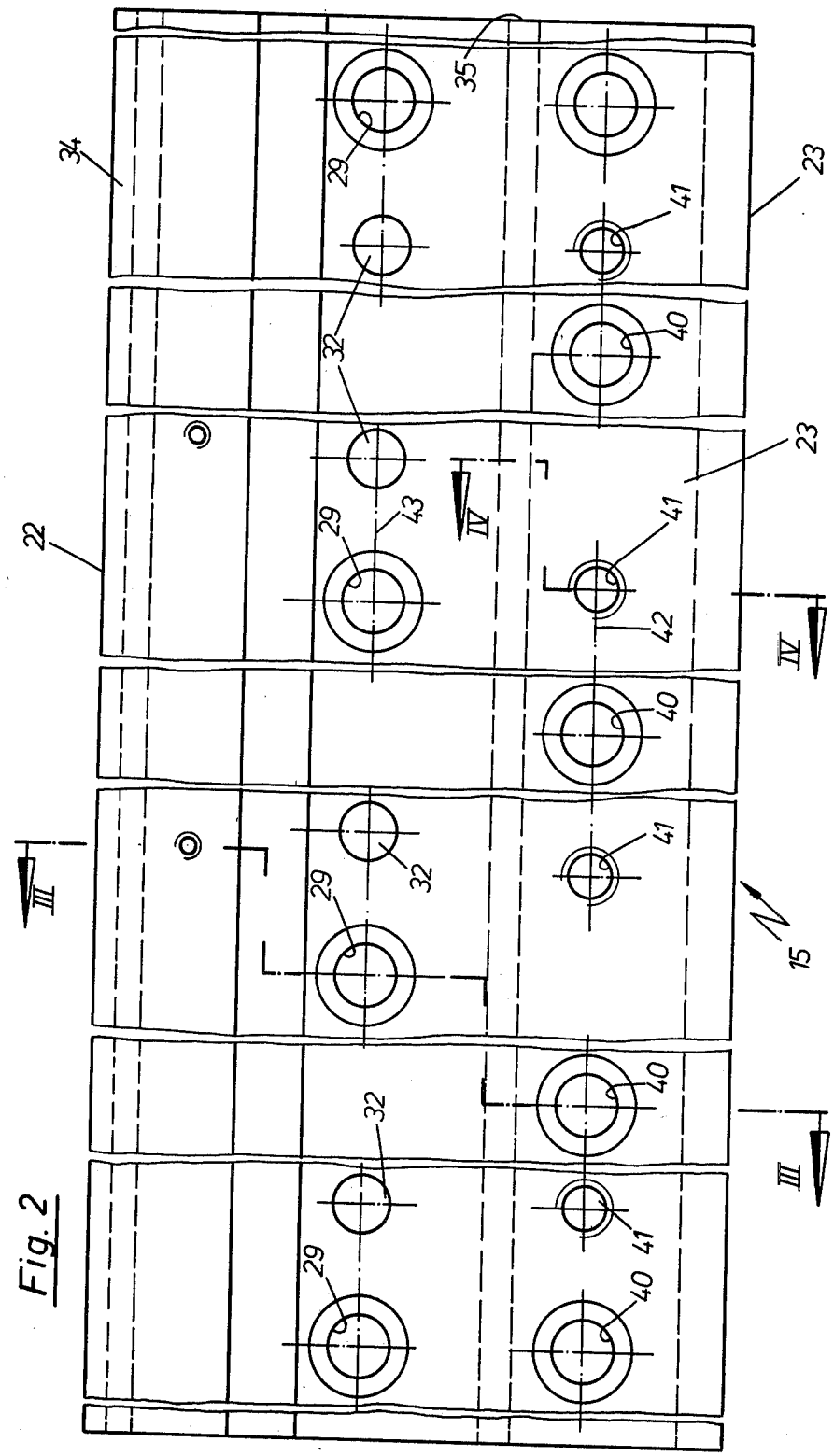
FIG. 2 is an enlarged side view of the guide rail in FIG. 1.

As will be seen from FIG. 2, the bolts 36 and the set screws 37 are arranged along an imaginary common line 42 approximately parallel to the horizontal guide surface 22 and running parallel to the line 43, along which the through holes 29 and 32 are grouped at intervals from one another. A set screw 37 is fitted on each side of each bolt 36, a short distance from it, longitudinally of the longitudinal strip 33, so that sagging of the longitudinal strip 33 in the longitudinal section between one set screw 37 and the next in the vicinity of the bolt 36 is avoided. In addition, the bolts 36 on the longitudinal strip 33 are staggered approximately centrally between and below the bolts 28 by means of which the upper strip section 34 is secured with its supporting surface 26 to the side surface 27.

The longitudinal strip 33 and consequently its longitudinal guide surface 23 can be adjusted by means of the bolts 36 and set screws 37 in such a way that the linear alignment of the longitudinal guide surface 23 runs exactly parallel to the linear reference line 13. This means that deviations in the parallelism and shape of the side surface 27, in terms of the linear reference line 13, are equalized at numerous individual points along the longitudinal strip 33. To achieve this equalization, the set screws 37 on each side of a bolt 36 are adjusted to each adjusting point so that, with their free end pressing against the side surface 27, they provide the required gap $a$ between the rear surface 39 and the side surface 27. The gap, adjusted in this way for each adjustment point, is then maintained by means of the tightened bolts 36 which are thereby subjected to a tensile load and at the same time serve to secure the longitudinal strip 33 to the side surface 27. The set screws 37 are thereby subjected to a compressive load.

In another version, which is not shown, smooth cylindrical pins, instead of the set screws 37, can be used as distance pieces, and can be axially adjusted at the lefthand end, as seen in FIG. 4, by means of bolts adjustably screwed into the longitudinal strip 33.

We claim:

1. A guide rail, for guiding the carriage of a measuring or tracing device along one longitudinal side of a stationary levelling plate having an upper plane surface with a linear reference line thereon, and means for securing said guide rail along said one side of said levelling plate, said guide rail including:
   (i) a first strip section extending along the whole of the length of the rail and having thereon a longitudinal guide surface for positioning said carriage in a plane parallel to a plane transverse to said plane surface and passing through said reference line
   (ii) a second strip section having thereon:
      (a) a carriage-bearing guide surface for positioning said carriage in a plane parallel to the plane defined by said plate upper surface, and
      (b) a butting face for abutting against the side of the plate
   (iii) flexible bi-axial joint means connecting said first strip to said second strip over at least a major part of their length,
whereby, with said second strip section secured to the levelling plate with the butting face butted against the side of the plate, said first strip section may be moved, relative to said second strip section, normal to said guide surface for bringing the guide surface into parallelism with the reference line.

2. A guide rail, in accordance with claim 1, wherein the bi-axial means is a deformable longitudinal web.

3. A guide rail, in accordance with claim 2, wherein the longitudinal web is integral with, and made of the same material as, the first and second strip sections.

4. A guide rail, in accordance with claim 2, having a longitudinal groove which defines therein said first strip section and said second strip section, and said web, the depth of said grooves being a major proportion of the cross-section of the rail and its base being bounded by said web.

5. A guide rail, in accordance with claim 4, wherein the longitudinal groove is substantially parallel to said carriage-bearing surface.

6. A guide rail, in accordance with claim 4, wherein the sides of the longitudinal groove are aligned substantially parallel to said carriage-bearing surface.

7. A guide rail, in accordance with claim 1, wherein the bi-axial joint means is aligned approximately at right angles to said carriage-bearing surface.

8. A guide rail, in accordance with claim 4, wherein a surface of the longitudinal web remote from the base of the groove lies substantially in the plane containing said longitudinal guide surface.

9. A guide rail, in accordance with claim 1, wherein a surface of said first longitudinal strip opposite to said guide surface is offset relative to the butting face of the second strip section.

10. A guide rail, in accordance with claim 1, in combination with fixing devices for the adjustable securing of the first longitudinal strip section relative to the levelling plate, said fixing devices comprising bolts passing at intervals along the length of said strip section transversely through the strip section for screwing into the side of the levelling plate.

11. A guide rail, in accordance with claim 10, wherein the fixing devices further comprise distance pieces which pass through the first longitudinal strip and which have a free end to bear against said side surface.

12. A guide rail, in accordance with claim 11, wherein the distance pieces are transverse pins which are longitudinally adjustable by bolts engaged adjustably in the first strip section and each bearing axially against a respective transverse pin.

13. A guide rail, in accordance with claim 11, wherein the distance pieces are Allen set screws adjustably fitted in threaded holes in the first strip section.

14. A guide rail, in accordance with claim 10, wherein the bolts are arranged along an imaginary common line running approximately parallel to said carriage-bearing surface.

15. A guide rail, in accordance with claim 11, wherein a distance piece is provided in the first strip section on both sides of each bolt and at a short distance therefrom longitudinally of the strip section.

16. A guide rail, in accordance with claim 10, comprising bolts disposed at intervals longitudinally of said second strip section for securing it to said levelling plate, the bolts of the first strip section being each disposed on a respective line passing approximately centrally between two adjacent bolts of the second strip section.

* * * * *

UNITED STATES PATENT AND TRADEMARK OFFICE
CERTIFICATE OF CORRECTION

PATENT NO. : 4,102,051
DATED : July 25, 1978
INVENTOR(S) : KARL REIFF and KLAUS MASUR It is certified that error appears in the above-identified patent and that said Letters Patent are hereby corrected as shown below:

[73] Assignee: Fa. C. Stiefelmayer K.G., Esslingen, Germany

Signed and Sealed this

Eighteenth Day of March 1980

[SEAL]

Attest:

SIDNEY A. DIAMOND

Attesting Officer  Commissioner of Patents and Trademarks